Nov. 7, 1933.   D. L. GALLUP   1,934,491
BRAKE
Filed Feb. 11, 1929

INVENTOR.
DAVID L. GALLUP
BY
ATTORNEY

Patented Nov. 7, 1933

1,934,491

UNITED STATES PATENT OFFICE 1,934,491

BRAKE

David L. Gallup, South Bend, Ind., assignor to Bendix Brake Company, South Bend, Ind., a corporation of Illinois Application February 11, 1929. Serial No. 339,010

4 Claims. (Cl. 188—79.5)

This invention relates to brakes, and is illustrated as embodied in an internal expanding brake for an automobile. An object of the invention is to provide a simple and inexpensive adjustment for a brake, by providing a shoe or its equivalent with thrust means adjustable to compensate for wear, and which preferably includes one or a pair of rigid links.

The invention is illustrated as embodied in a brake of the type anchoring on one shoe when the drum is turning in one direction and anchoring on a different shoe when the drum is turning in the other direction, thus being fully self-energizing in either direction of drum rotation, the adjustable links serving to connect the shoes. Preferably the links are connected to the shoes by pivots, one or both of which have eccentric portions engaging the link and the corresponding shoe respectively, to provide the desired adjustment.

Other objects and features of the invention, including various novel and desirable details of the construction and arrangement of the adjustment, will be apparent from the following description of one illustrative embodiment shown in the accompanying drawing, in which.

Figure 1:
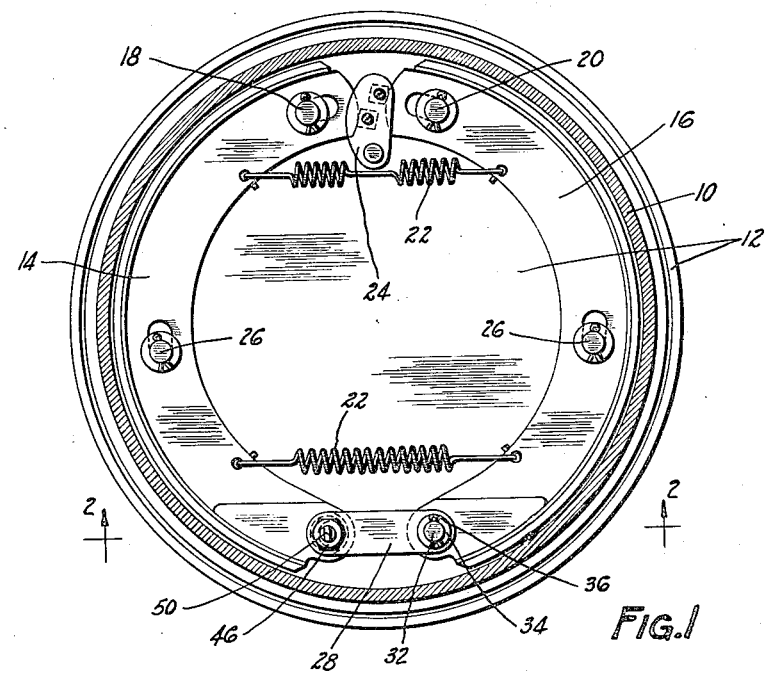
Figure 1 is a vertical section through the brake, just inside the head of the brake drum, showing the brake shoes in side elevation.
Figure 2:
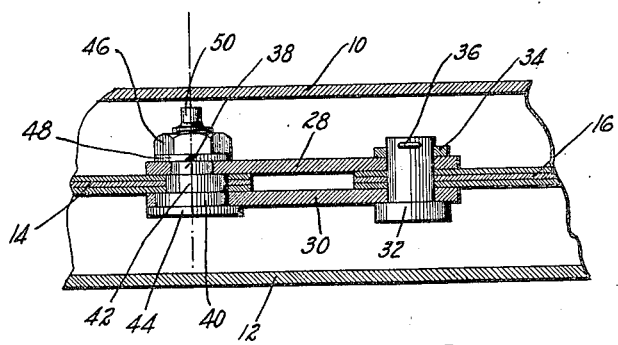
Figure 2 is a partial section through the adjustment, on the line 2—2 of Figure 1.
Figure 3:
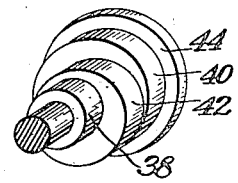
Figure 3 is a perspective view of the eccentric pivot connecting the links and one (or both) of the shoes.

The illustrated brake includes a drum 10, at the open side of which is a backing plate 12, and within which are arranged brake shoes 14 and 16, shown as interchangeable. When the drum is turning clockwise, shoe 14 anchors on a post 18, and when the drum is turning counter-clockwise the shoe 16 anchors on a post 20. The brake is applied against the resistance of return springs 22 by means such as a floating cam lever 24 at the upper side of the drum. Suitable steady rests 26 are provided for the shoes.

At the side of the drum opposite the applying means 24, the shoes 14 and 16 are connected by adjustable thrust means, preferably including a pair of rigid links or the like 28 and 30 arranged on the opposite sides of the shoes and connected thereto at opposite ends. The connection to shoe 16 may if desired be a simple pivot 32, on which the shoe 16 and the links 28 and 30 can turn freely, and which may have a head engaging one link and a washer 34 held by means such as a cotter pin 36 and engaging the other link.

I prefer, however, that the connection between shoe 14 and the links be by means such as a pivot having coaxial portions 38 and 40 on which links 28 and 30 are mounted respectively, and an intermediate portion 42 which engages shoe 14 and which is eccentric with respect to the portions 38 and 40. This pivot may have a head 44 engaging one of the links, and I prefer that it have a nut 46 threaded on the other end (with a lock-washer 48 if desired) engaging the other of the links. The end of the pivot is formed as a flattened wrench-receiving portion 50.

It will be seen that upon turning the eccentrically-adjustable pivot 38—40—42 the two shoes are spread apart to compensate for wear of the brake. I prefer that the parts be so arranged that, when the nut 46 is tightened after making an adjustment, the link 28 is frictionally gripped to the pivot so that ordinarily the links do not move with respect thereto, although they do shift with the pivot when brake-applying pressure is applied, in order to adjust their positions automatically.

While one illustrative embodiment has been described in detail, it is not my intention to limit the scope of the invention to that particular embodiment, or otherwise than by the terms of the appended claims.

I claim:

1. A pair of floating brake shoes arranged end to end and having their adjacent ends connected by a pair of links on opposite sides of the shoes said links being connected solely to said shoes and devices connecting the links to the respective shoes, at least one of which devices is adjustable to spread the shoes apart.

2. A pair of floating brake shoes arranged end to end and having their adjacent ends connected by a pair of links on opposite sides of the shoes said links being connected solely to said shoes and pivots connecting the links to the respective shoes, at least one of which pivots is adjustable to spread the shoes apart.

3. A pair of floating brake shoes arranged end to end and having their adjacent ends connected by a pair of links on opposite sides of the shoes said links being connected solely to said shoes and devices connecting the links to the respective shoes, at least one of which devices is an adjustable eccentric.

4. A pair of floating brake shoes arranged end to end and having their adjacent ends connected by a pair of links on opposite sides of the shoes said links being connected solely to said shoes and pivots connecting the links to the respective shoes, at least one of which pivots is an adjustable eccentric.

DAVID L. GALLUP.